UNITED STATES PATENT OFFICE.

JOHANNES JACOBUS WERST, OF ARNHEM, NETHERLANDS, ASSIGNOR TO NAAMLOOZE VENNOOTSCHAP NEO-CELLULOSE MAATSCHAPPIJ, OF ROTTERDAM, NETHERLANDS.

PROCESS FOR SEPARATING IMPURITIES FROM WASTE FIBROUS MATERIALS.

1,249,575. Specification of Letters Patent. Patented Dec. 11, 1917.

No Drawing. Application filed May 22, 1916. Serial No. 99,257.

*To all whom it may concern:*

Be it known that I, JOHANNES JACOBUS WERST, chemical engineer, subject of the Queen of the Netherlands, residing at Arnhem, (Kingdom of the Netherlands,) Badhuisstraat, have invented certain new and useful Improvements in Processes for Separating Impurities from Waste Fibrous Materials, of which the following is a specification.

In the specification to the American Patent No. 1.083.234 is described a process for separating waste fibrous materials from admixtures, coloring matters and impurities, wherein is applied the adhesiveness of two liquids or two liquid masses of different specific gravity. The process may be used, for example, for separating paper or paper pulp from adhering printing ink black or other coloring matter.

The adhesiveness of the liquids may be so selected that one liquid may have a higher affinity for the impurities and the other a higher affinity for the fibrous material to be separated or collected.

The fibrous material may be subjected to a preliminary operation, such as boiling with a solution of a sulfid, a thiosulfate or a thionate or an alkaline sulfite solution, before it is treated by the separating process.

The separated impurities may collect in one of two manners. Either they appear at the surface separating the two liquids or they distribute themselves throughout the whole mass of the specifically lighter liquid. A special case of separation of the impurities at the surface separating the two liquids occurs, when the specifically lighter liquid forms a foam with the specifically heavier liquid, with the impurities and with the air; this floats on the surface of the specifically lighter liquid.

In order that the inventive purpose of my invention may fully be understood, it may further be pointed out in the following:

If the impurities are separated in the usual way as above described, their separation takes place in the shape of individual small parts or small bodies; that is to say coal, carbon, black are removed in independent small pieces or correls.

If however the separation of impurities or other foreign admixtures is effected by means of foam, larger quantities of such impurities are united in the foam, in a way allowing quick and easy removal of the impurities and foreign admixtures collected.

The separated impurities of the foam may be collected in manner depending on the mechanical operation, to which the liquids have been subjected; and when mechanical means have been used for producing a strong whirl of air in the liquids, the operation may be so conducted, that the impurities settle in the form of foam on the surface of the specifically lighter liquid.

Now I have found by investigation, more particularly microscopical, that the foam which settles on the surface of the liquid, consists essentially of four parts, namely:— an inner core of air (air bubble) having the specifically lighter liquid (benzin or the like) as its shell; these two are surrounded by a layer of the heavier liquid (water) on the surface between which layer and the specifically lighter liquid the impurities collect.

These four phases connected together and settled on the surface of the specifically lighter liquid, constitute the foam.

When water and a liquid hydrocarbon are the two liquids and these are used for the separation, particularly of printing ink black, or other coloring matter, from newspaper and the like, and when the operation involves formation of foam by means of an apparatus for producing strong whirling of air (such as the emulsifier described in the U. S. A. Patent No. 1.083.234), there is formed a foam of extraordinary stability which can hardly be dispersed.

This stability presents the advantage that the foam can easily be removed from the liquid.

On this discovery is based the present invention, which in the first place consists in aiming at the maximum artificial formation of foam by means of suitably powerful mechanical devices, whereby the advantage is attained that the specifically lighter agent may be used in only small proportion and the loss of the quantity used is reduced to a minimum.

It has been found, however, that if the proportion of the specifically lighter liquid is too much reduced, the foam loses in stability.

In the second place the present invention consists in artificially lending to the foam the stability which is necessary for completely separating printing ink black, coloring matter or other impurities (hereinafter collectively termed impurities) from fibrous materials, by substituting for the specifically lighter liquid another agent adapted to serve instead of this liquid.

The particular point in this second feature of the invention is the use of a substitute adapted to fulfil a two-fold technical purpose:

(1) a substitute for the specifically lighter liquid (hydrocarbon).

(2) a stabilizer of the foam, imparting to this such strength as may be necessary for rationally conducting the process of separation.

I have found that:

(a) suitable substitutes for the liquid hydrocarbons are the non-liquid fats, or fat-like bodies, including higher hydrocarbons, such as vaseline or solid fat, or fats in general or semi-solid materials, such as vegetable fats, margarin or the like, and (b) the effect of these materials in the present process resides in the stabilization of the foam produced, in order to lend it that resistance and solidity which renders possible its easy removal from the liquid together with the impurities contained in it.

Now the use of these materials, that is to say, the higher hydrocarbons and the fats in general or the semi-solid materials, has proved that they are active stabilizers but unlike the lower hydrocarbons, which are both excellent stabilizers and foam producers, are not suitable for producing foam.

It is necessary, therefore, to find substances which in presence of these new stabilizers exert a corresponding foam producing effect.

As such foam substances suitable for separating impurities from fibrous material, may be named the soda soaps of higher fatty acids, such as oleic acid or stearic acid.

The foaming action of soaps is in itself known; it is not, however, of itself suitable for the purpose in question because the soap foam is not stable and breaks up. The soap must, therefore, be used only in combination with one of the aforesaid new stabilizers.

In the third place the invention avoids the use of solutions of sulfids, thiosulfates or thionates, or of alkaline sulfite solutions, and the novelty resides in preliminarily treating the material which is to be freed from impurities, that is to say in loosening these impurities from the fiber, by means of foam producers which are not in themselves adapted to form a stable foam, such as the soda soaps of higher fatty acids, like stearic acid or oleic acid.

In practising the invention, the fibrous material to be treated for its purification for fresh technical application, is first subjected in suitable manner to the action of any medium adapted to loosen the impurities from the fiber.

The material thus preliminarily treated is then subjected to the action of two bodies having the requisite adhesiveness, one a liquid, such as water, and the other a combination of two bodies, namely a foam producer and a stabilizer.

As foam producer, soap will serve; as stabilizer one of the hydrocarbons of the higher series, a fat, a semi-solid substance, like vegetable fat, margarin, vaseline or solid fat.

For the purpose of acting with the foam producer and the stabilizer on the liquid which loosens the impurities, both the producer and the stabilizer are added to the liquid and the mass is powerfully stirred and agitated by a mechanical device, while air is forcibly driven into the mass so that much air may be taken up thereby to produce the foam.

Then follows the separation of the foam from the purified, specifically heavier liquid in which the fibers are suspended. The foam is now removed from the surface of the liquid and the fibers together with the liquid containing them are applied for the intended purpose.

An apparatus suitable for conducting these operations is described in the aforesaid patent. Any other suitable apparatus may, however, be used.

The considerable technical improvements achieved by the invention are:—

(1) that quite small proportions of these foam producers and stabilizers suffice to produce comparatively large quantities of foam and to maintain the foam in a durable solid form;

(2) that the process of recovering the specifically lighter liquid, which constitutes an essential feature of the original procedure, is eliminated, because the matter substituted for this specifically lighter liquid is used in such small proportion that its recovery is not of any importance;

(3) that there is a saving of material, due to the elimination of the specifically lighter liquid and to the fact that the matter substituted for it need be used only in such small proportion, as is necessary for producing the foam.

The process may be so conducted that the preliminary treatment of the fibrous material for loosening the impurities may be effected by soap.

In this case there is the advantage that the soap used as loosening agent, may act in the subsequent purification, in the presence of the added stabilizer, as foam producer.

Having now particularly described and ascertained the nature of my said invention and in what manner the same is to be performed, I declare that what I claim is:—

1. Process of separating impurities from waste fibrous material which consists in agitating such materials in presence of a cleansing agent comprising a non-liquid fat and a foam producing soap, and separating the resulting stable foam carrying the impurities from the cleansed fiber.

2. Process of separating impurities from waste material which consists in treating the fibrous material with a cleansing agent including a foam producing soap and agitating it thereafter in presence of non-liquid fat, and separating the resulting stable foam carrying the impurities from the cleansed fiber.

3. Process of separating impurities from waste fibrous material which consists in agitating such materials in presence of a cleansing agent, comprising a non-liquid fat-like body including higher hydrocarbons and a foam producing soap, and separating the resulting stable foam carrying the impurities from the cleansed fiber.

4. Process of separating impurities from waste fibrous material, which consists in treating the fibrous material with a cleansing agent including a foam producing soap and agitating it thereafter in presence of a non-liquid fat-like body, including higher hydrocarbons, and separating the resulting stable foam carrying the impurities from the cleansed fiber.

5. Process of separating impurities from waste fibrous material which consists in agitating such materials in presence of a cleansing agent, comprising a non-liquid fat and a foam producing soap of the higher fatty acids, and separating the resulting stable foam carrying the impurities from the cleansed fiber.

6. Process of separating impurities from waste fibrous material which consists in agitating such materials in presence of a cleansing agent, comprising a non-liquid fat-like body including higher hydrocarbons and a foam producing soap of the higher fatty acids, and separating the resulting stable foam carrying the impurities from the cleansed fiber.

In testimony whereof, I affix my signature in the presence of two witnesses.

JOHANNES JACOBUS WERST.

Witnesses:
I. I. HILSDON REX,
K. EKKEY.